United States Patent
Han

(10) Patent No.: US 11,303,375 B2
(45) Date of Patent: Apr. 12, 2022

(54) SYNCHRONIZATION INFORMATION TRANSMISSION METHOD, SYNCHRONIZATION METHOD, NETWORK NODE AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventor: Liuyan Han, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

(*) Notice: Subject to any disclaimer, the term of this patent is extended or adjusted under 35 U.S.C. 154(b) by 0 days.

(21) Appl. No.: 16/959,712

(22) PCT Filed: Jan. 2, 2019

(86) PCT No.: PCT/CN2019/070151
§ 371 (c)(1),
(2) Date: Jul. 2, 2020

(87) PCT Pub. No.: WO2019/134653
PCT Pub. Date: Jul. 11, 2019

(65) Prior Publication Data
US 2021/0091869 A1 Mar. 25, 2021

(30) Foreign Application Priority Data
Jan. 2, 2018 (CN) .......................... 201810000644.9

(51) Int. Cl.
*H04J 3/06* (2006.01)
*H04L 45/122* (2022.01)

(52) U.S. Cl.
CPC .......... *H04J 3/0673* (2013.01); *H04L 45/122* (2013.01)

(58) Field of Classification Search
CPC ............................ H04J 3/0673; H04L 45/122
See application file for complete search history.

(56) References Cited

U.S. PATENT DOCUMENTS

| 10,244,495 B1* | 3/2019 | Thong ................. H04W 56/001 |
| 2001/0005361 A1* | 6/2001 | Lipsanen .............. H04J 3/0679 370/238 |

(Continued)

FOREIGN PATENT DOCUMENTS

| CN | 101257361 A | 9/2008 |
| CN | 101931883 A | 12/2010 |

(Continued)

OTHER PUBLICATIONS

International Search Report in the international application No. PCT/CN2019/070151, dated Mar. 27, 2019.

(Continued)

*Primary Examiner* — Chi H Pham
*Assistant Examiner* — Weibin Huang
(74) *Attorney, Agent, or Firm* — Syncoda LLC; Feng Ma

(57) ABSTRACT

A synchronization information transmission method includes: receiving synchronization information sent by a preceding node; on the basis of synchronization accuracy information of a current node, updating intermediate node information in the synchronization information; and sending the updated synchronization information to a subsequent node.

20 Claims, 10 Drawing Sheets

(56) References Cited

U.S. PATENT DOCUMENTS

| | | |
|---|---|---|
| 2011/0150005 A1 | 6/2011 | Chen |
| 2013/0243140 A1 | 9/2013 | Buhl |
| 2015/0222413 A1* | 8/2015 | Pietilainen ............ H04J 3/0641 709/248 |
| 2016/0013876 A1* | 1/2016 | Zhang .................. H04J 3/0667 370/350 |
| 2016/0094335 A1* | 3/2016 | Roberts ................ H04L 7/0008 375/356 |
| 2017/0105185 A1* | 4/2017 | Chen .................... H04W 56/00 |
| 2017/0359139 A1* | 12/2017 | Butterworth ............ H04L 69/08 |

FOREIGN PATENT DOCUMENTS

| | | |
|---|---|---|
| CN | 102368696 A | 3/2012 |
| CN | 102664699 A | 9/2012 |
| CN | 102694642 A | 9/2012 |
| CN | 103686982 A | 3/2014 |
| CN | 104486058 A | 4/2015 |
| CN | 106162858 A | 11/2016 |
| WO | 2013189536 A1 | 12/2013 |

OTHER PUBLICATIONS

English Translation of the Written Opinion of the International Search Authority in the international application No. PCT/CN2019/070151, dated Mar. 27, 2019.

"IEEE Standard Profile for Use of IEEE 1588 Precision Time Protocol in Power System Applications; IEEE Std C37.238-2017 (Revision of IEEE Std C37.238-2011)", IEEE Standard, IEEE, Piscataway, NJ USA, Jun. 17, 2017 (Jun. 17, 2017), pp. 1-42, XP068114900, DOI: 10.1109/IEEESTD.2017.7953616 ISBN: 978-1-5044-2326-7 [retrieved on Jun. 17, 2017] * p. 20 * * p. 21; table A *.

First Office Action of the Chinese application No. 201810000644.9, dated Jun. 3, 2019.

Second Office Action of the Chinese application No. 201810000644.9, dated Nov. 12, 2019.

Supplementary European Search Report in the European application No. 19735744.5, dated Feb. 23, 2021.

* cited by examiner

SYNCHRONIZATION INFORMATION TRANSMISSION METHOD, SYNCHRONIZATION METHOD, NETWORK NODE AND STORAGE MEDIUM

CROSS-REFERENCE TO RELATED APPLICATIONS

This application is a national stage of International Application No. PCT/CN2019/070151 filed on Jan. 2, 2019, which claims priority to Chinese Patent Application No. 201810000644.9, filed on Jan. 2, 2018. The disclosure of these applications is hereby incorporated by reference in their entireties.

TECHNICAL FIELD

The disclosure relates, but is not limited, to the technical field of networks, and in particular to a method for synchronization information transmission, a synchronization method, a network node, and a storage medium.

BACKGROUND

During data transmission, it is necessary to synchronize network nodes participated in the data transmission. For example, in various network nodes such as a communication system, a finance system and a current system, the synchronization may be involved when data is output.

During synchronization, a synchronization source sends, via one or more intermediate nodes located on a synchronization path, a synchronization signal to a node in to be synchronized. In the conventional art, the information transmitted together with the synchronization signal further includes: synchronization source information of the synchronization source; and synchronization information jointly formed by the synchronization source information and the synchronization signal is transmitted to the node to be synchronized. The node to be synchronized selects a corresponding synchronization signal according to the synchronization source information for synchronization. The synchronization source information may include: information for indicating clock accuracy and the like of the synchronization source.

However, it is practically found in use that the synchronization signal selected sometimes is not the best synchronization signal, which results in the poor synchronization effect.

SUMMARY

In view of this, the embodiments of the disclosure are intended to provide a method for synchronization information transmission, a synchronization method, a network node, and a storage medium.

The technical solutions of the disclosure are implemented as follows:

According to a first aspect, the embodiments of the disclosure provide a method for synchronization information transmission, which includes the following operations.

Synchronization information sent by a previous node is received.

Intermediate node information in the synchronization information is updated according to synchronization accuracy information of a current node.

The updated synchronization information is sent to a next node.

According to a second aspect, the embodiments of the disclosure provide a synchronization method, which includes the following operations.

Synchronization information is received.

Intermediate node information is extracted from the synchronization information, the intermediate node information being indication information corresponding to synchronization accuracy information of an intermediate node for transmitting the synchronization information.

Synchronization information for synchronizing a current node is selected according to the intermediate node information.

According to a third aspect, the embodiments of the disclosure provide a network node, which includes: a first receiving unit, an update unit and a first sending unit.

The first receiving unit is configured to receive synchronization information from a previous node.

The update unit is configured to update intermediate node information in the synchronization information according to synchronization accuracy information of a current node.

The first sending unit is configured to send the updated synchronization information to a next node.

According to a fourth aspect, the embodiments of the disclosure provide a network node, which includes: a second receiving unit, an extraction unit, and a selection unit.

The second receiving unit is configured to receive synchronization information.

The extraction unit is configured to extract intermediate node information from the synchronization information, the intermediate node information being indication information corresponding to synchronization accuracy information of an intermediate node for transmitting the synchronization information.

The selection unit is configured to select, according to the intermediate node information, synchronization information for synchronizing a current node.

According to a fifth aspect, the embodiments of the disclosure provide a network node, which includes: a network interface, a memory, a processor, and a computer program stored in the memory and executed by the processor.

The processor is connected to the network interface and the memory, and configured to perform, by executing the computer program, the method for synchronization information transmission provided by the above one or more technical solutions, or perform the synchronization method provided by the above one or more technical solutions.

According to a sixth aspect, the embodiments of the disclosure provide a computer storage medium having stored therein a computer program that, when executed by a processor, causes the processor to perform the method for synchronization information transmission provided by the above one or more technical solutions, or perform the synchronization method provided by the above one or more technical solutions.

According to the method for synchronization information transmission, the synchronization method, the network node, and the storage medium provided by the embodiments of the disclosure, during transmission of the synchronization information, the intermediate node updates the intermediate node information in the synchronization information according to its own synchronization accuracy information; in this way, after receiving the synchronization information, the node to be synchronized can select preferable synchronization information in combination with the intermediate node information for synchronization; and the problem of poor synchronization effect due to the fact that the synchronization information is merely selected according to the synchronization source information and the synchronization information with a larger time error is selected is prevented.

DETAILED DESCRIPTION

Figure 1:
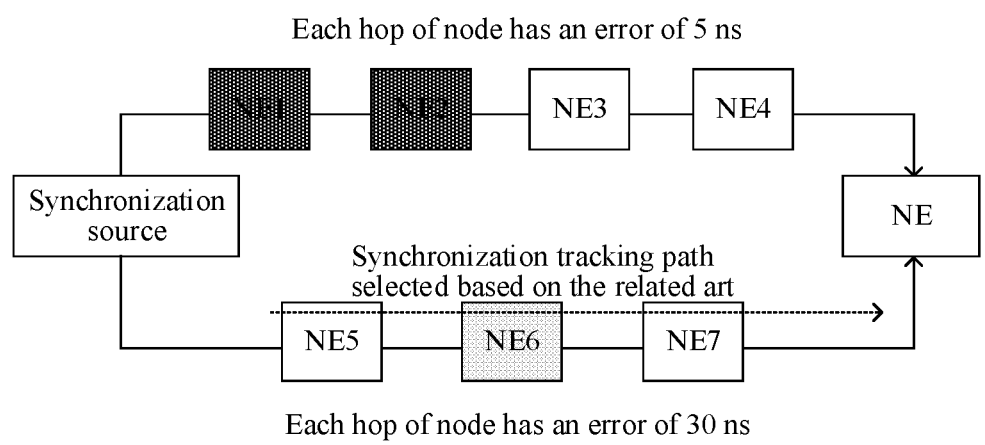
FIG. 1 illustrates a schematic diagram for transmitting synchronization information according to an embodiment of the disclosure.

FIG. 1 illustrates a synchronization source, Network Equipment (NE) to be synchronized, and two synchronization paths. The NE1, NE2, NE3 and NE4 for transmitting the synchronization information are provided on one synchronization path, and the NE5, NE6 and NE7 for transmitting the synchronization information are provided on the other synchronization path. It is assumed that ultra-high accuracy nodes are provided on the NE1→NE2→NE3→NE4 path, and a time error introduced by each of the nodes is within 5 ns, and that the nodes on the NE5→NE6→NE7 path have larger time errors, and a time error introduced by each of the nodes is about 30 ns. In a case where the selection is made only based on synchronization source information and the total number of nodes through which synchronization information passes, the synchronization information transmitted on the NE5→NE6→NE7 path will be selected. However, each device on the synchronization path has synchronization accuracy lower than that of the device on the NE1→NE2→NE3→NE4 path, such that the introduced time error is larger. At this time, it is apparent that the NE selects a synchronization signal, in the synchronization information into which more deviations are introduced, for synchronization, resulting in poor synchronization effect. In view of this, in the embodiment of the disclosure, when the synchronization information is transmitted, an intermediate node located on the synchronization path and used for transmitting the synchronization information writes intermediate node information relevant to the own synchronization accuracy into the synchronization information. In this way, after receiving the synchronization information, a node to be synchronized can select synchronization information having a minimum current time error based on synchronization source information and the intermediate node information, etc., and is synchronized according to a synchronization signal in the selected synchronization information, thereby improving the synchronization effect. For example, if the current synchronization information carries the intermediate node information, the intermediate node information may be used for indicating an accuracy class and other information of a passing intermediate node. In such a case, the NE will preferentially use a synchronization signal in the synchronization information transmitted on the NE1→NE2→NE3→NE4 path to adjust a frequency of its own clock and/or rewrite time information of its own system. The technical solutions of the disclosure are further described below in detail in combination with the accompanying drawings and specific embodiments of the specification.

Figure 2:
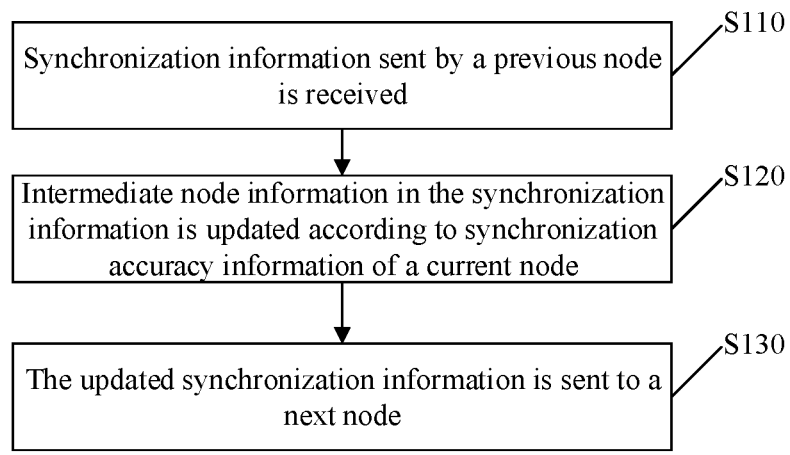
FIG. 2 illustrates a schematic flowchart diagram of a method for synchronization information transmission according to an embodiment of the disclosure.

As illustrated in FIG. 2, an embodiment provides a method for synchronization information transmission, which includes the following operations.

At S110: synchronization information sent by a previous node is received.

At S120: intermediate node information in the synchronization information is updated according to synchronization accuracy information of a current node.

At S130: the updated synchronization information is sent to a next node.

The method for synchronization information transmission provided by the embodiment is an information processing method applied to an intermediate node on a synchronization path. The synchronization path is a path for transmitting a synchronization signal, or, a path formed by connecting nodes through which the same piece of synchronization information passes.

On a synchronization path, a first node serves as a synchronization source, and the synchronization source is a node for providing the synchronization signal to form a first piece of synchronization information. The synchronization signal includes not only a synchronization signal for frequency synchronization or time synchronization by a node to be synchronized, but also relevant information of the synchronization source which may be referred to as the synchronization source information in the embodiment. The synchronization source information may include: various types of information relevant to time accuracy and/or time synchronization, such as accuracy information for indicating the clock accuracy of the synchronization source, and accuracy class information for indicating the accuracy class of the synchronization source.

After receiving the synchronization information from the previous node, the intermediate node updates the intermediate node information in the synchronization information according to its own synchronization accuracy information. In the embodiment, the synchronization accuracy information may be used for describing information of a time error introduced into one synchronization signal or one piece of synchronization information. The larger the introduced time error, the lower the synchronization accuracy information; and the smaller the introduced time error, the higher the synchronization accuracy information. For example, if the introduced time error of the node A is within 5 ns, and the introduced time error of the node B is within 30 ns, the synchronization accuracy information of the node A is higher than that of the node B.

In the embodiment, the synchronization accuracy information may be a synchronization accuracy value of the network node, and may also be a synchronization accuracy class of the network node. To sum up, the synchronization accuracy information may be information which directly or indirectly indicates the synchronization accuracy of a network node.

In the embodiment, the previous node is any network node that transmits the synchronization information to the current node, and may be a synchronization source that forms the synchronization information, and may also be an intermediate node for transmitting the synchronization information.

The next node may be any network node for receiving the synchronization information after the current node, may be a node to be synchronized, and may also be a next intermediate node for transmitting the synchronization information to the node to be synchronized.

In the embodiment, the node that transmits synchronization information will add information for describing its synchronization accuracy information into the synchronization information according to its synchronization accuracy information, or, modify a field in the synchronization information such that the modified field can indicate or characterize the synchronization accuracy information of the current node.

Step S120 may include one of the following indications.

The intermediate node information such as an accuracy class indication for indicating its own accuracy class is added into a reserved byte of the synchronization information according to the synchronization accuracy information of the current node.

The intermediate node information such as the accuracy class indication for indicating its own accuracy class is added into the synchronization information according to the synchronization accuracy information of the current node.

The intermediate node information such as the accuracy class indication for indicating the accuracy class is added into a reserved byte of a used field of the synchronization information according to the synchronization accuracy information of the current node.

In a scenario, when the previous node adds the own accuracy class indication into the intermediate node information in the synchronization information and transmits the synchronization information to the current node, the current node also adds, according to the own synchronization accuracy information, an accuracy class indication for indicating a synchronization accuracy class of the current node into the synchronization information. Therefore, if a piece of synchronization information passes through S intermediate nodes, the intermediate node information includes accuracy class indications of the S intermediate nodes. The accuracy class indication is used for indicating the accuracy class of the corresponding network node.

In another scenario, the intermediate node information does not carry any accuracy class indication, for example, the synchronization information is transmitted to the current node from an intermediate node of a lower version, and the previous node did not add its own accuracy class indication into the synchronization information. While, the current node is the network node of a higher version; and at this time, the current node is a first node that adds the accuracy class indication into the synchronization information.

In some embodiments, Step S120 further includes the following operation.

If synchronization accuracy information corresponding to the accuracy class indication in the intermediate node information is different from that of the current node, the accuracy class indication is modified.

For example, the synchronization information sent by the previous node carries the accuracy class indication; after receiving the synchronization information from the previous node, the current node compares a synchronization accuracy class indicated by the accuracy class indication in the received synchronization information with a synchronization accuracy class of the current node; if the comparison result is that the synchronization accuracy class indicated by the accuracy class indication in the received synchronization information is the same as the synchronization accuracy class of the current node, the accuracy class indication is maintained to be unchanged; and if the comparison result is that the synchronization accuracy class indicated by the accuracy class indication in the received synchronization information is different from the synchronization accuracy class of the current node, the accuracy class indication in the received synchronization information is modified to be the same as that of the current node. In some scenarios, when the synchronization source generates the synchronization information, an accuracy class indication is set. If the accuracy class indication corresponds to the synchronization accuracy class of the synchronization source or a default value, after receiving the accuracy class indication, the next network node compares synchronization accuracy corresponding to the accuracy class indication with its own synchronization accuracy, maintains the accuracy class indication unchanged if both are the same, and modifies the accuracy class indication if both are different. The subsequent synchronized network node may determine the synchronization accuracy class of the passing intermediate node of the synchronization information by means of comparison with the synchronization accuracy class of the synchronization source or the default value after receiving the synchronization information carrying such a type of accuracy class indication.

The intermediate node information is not limited to the accuracy class indication for indicating the synchronization accuracy information, and may further include at least one of the followings: a synchronization accuracy uniformity indication; or, node hop information of different pieces of synchronization accuracy information.

The synchronization accuracy uniformity indication is used for indicating whether accuracy classes of intermediate nodes on a synchronization path are consistent. For example, a value of a bit may be used for indicating that the accuracy classes of the intermediate nodes on the synchronization path are the same or different. For example, if the value of the bit value is "0," it indicates that the accuracy classes of the intermediate nodes on the synchronization path are the same, and if the value of the bit is "1," it indicates that the accuracy classes of the intermediate nodes on the synchronization path are different. Or, if the value of the bit value is "1," it indicates that the accuracy classes of the intermediate nodes on the synchronization path are the same, and if the value of the bit is "0," it indicates that the accuracy classes of the intermediate nodes on the synchronization path are different.

After receiving the synchronization information forwarded by the previous node, the current node finds that the synchronization accuracy uniformity indication indicates that the accuracy classes of all the intermediate nodes in the front are the same, if the accuracy class of the current node is different from that of the previous node, the synchronization accuracy uniformity indication is modified to an indication for indicating that the accuracy classes are different. After receiving the synchronization information forwarded by the previous node, the current node finds that the synchronization accuracy uniformity indication indicates that the intermediate nodes have different accuracy classes, the current node maintains the synchronization accuracy uniformity indication unchanged. As a consequence, as long as one node on the synchronization path has the accuracy class different from the accuracy classes of other nodes, the synchronization accuracy uniformity indication will be modified from the default value for indicating that the accuracy classes are the same to a non-default value for indicating that the accuracy classes are different.

In the embodiment, since the synchronization information is transmitted hop by hop, when the synchronization accuracy uniformity indication is modified, the current node only needs to compare the own accuracy class with the accuracy class of the previous node, does not modify the default value of the synchronization accuracy uniformity indication if both are consistent, and modifies the default value into the non-default value if both are inconsistent.

For the node hop information of the different pieces of synchronization accuracy information, for example, one synchronization path is provided with 10 intermediate nodes, and these nodes belong to three pieces of synchronization accuracy information. As such, the node hop information includes: three values, which respectively indicate the number of nodes that the synchronization information passes through and belonging to a respective one of the three pieces of the synchronization accuracy information. For example, if the synchronization accuracy information A corresponds to the accuracy class A, the synchronization accuracy information B corresponds to the accuracy class B, and the synchronization accuracy information C corresponds to the accuracy class C, the node hop information may include: three values, which respectively indicate the number of nodes with the accuracy class A that the synchronization information passes through, the number of nodes with the accuracy class B that the synchronization information passes through, and the number of nodes with the accuracy class C that the synchronization information passes through.

In Step S120, the current node performs, according to its own synchronization accuracy information or the accuracy class corresponding to the synchronization accuracy information, an increment operation on the number of nodes, in the node hop information, belonging to the synchronization accuracy information to which the current node belongs.

In some embodiments, the intermediate node information may merely include: the accuracy class indication of the intermediate node on the synchronization path. The intermediate node may be a node for transmitting the synchronization information other than the synchronization source and the node to be synchronized on the synchronization path. On the synchronization path, the first node serves as the synchronization source, i.e., the node providing the synchronization signal in the synchronization information, and the last node serves as the node to be synchronized, i.e., a node that performs own clock synchronization or time synchronization according to the synchronization provided by the synchronization source.

The node to be synchronized may perform one or more of the following operations according to the accuracy classes of intermediate nodes:

The number of intermediate nodes through which the currently received synchronization information has passed is determined by counting the number of intermediate nodes with different accuracy classes.

Whether the accuracy classes of the intermediate nodes are the same is determined by comparing the accuracy classes of the intermediate nodes.

Passing node hops of the synchronization information having different synchronization accuracy information are determined by counting numbers of different accuracy classes.

The accuracy class of each intermediate node is determined according to each accuracy class recorded in the synchronization information.

Therefore, the node to be synchronized may select the synchronization signal in the corresponding synchronization information according to a result of the above operation for the clock synchronization or time synchronization. The clock synchronization may be to adjust the frequency of a clock in the node to implement the clock synchronization among different nodes. Upon the completion of the clock synchronization, it is further possible to perform the time synchronization. For example, the device A and the device B are synchronous in current clock, i.e., both have the same timing for the same duration; but due to the different start time, the time synchronization is further necessarily performed. For example, the current time of the device A is 10:23:15, and the current time of the device B is 10:21:56. By means of the time synchronization, both the device A and the device B may have the same time result for the timing of the current time, for instance, the time is uniformly adjusted to 10:23:15 or 10:21:56.

In some embodiments, in order to simplify the processing of the synchronization node for the intermediate node information, it is further appropriate to update the synchronization information via the intermediate node during transmission of the synchronization information; and the synchronization accuracy uniformity indication and/or the node hop information corresponding to the different synchronization accuracy information and the like are directly recorded in the intermediate node information.

In some embodiments, the intermediate node information may merely include the node hop information corresponding to the different synchronization accuracy information. For example, the number of the pieces of the synchronization accuracy information for all devices in one network is limited.

When the synchronization source forms the synchronization information, a node hop field for recording the node hop information of the different accuracy classes is reserved in advance. Therefore, the intermediate node modifies the node hop information corresponding to the own synchronization accuracy information or accuracy class according to the own synchronization accuracy information or the accuracy class corresponding to the synchronization accuracy information. After receiving the synchronization information, the node to be synchronized may perform at least one of the following operations according to the node hop information:

The total number of passing nodes of the synchronization information may be counted according to the node hop information corresponding to the different synchronization accuracy information.

Whether the accuracy classes of the intermediate nodes on the current synchronization path are the same may be determined according to the node hop information corresponding to the different synchronization accuracy information, for example, when the node hops of at least two types of different synchronization accuracy information are not 0, it may be considered that the accuracy classes of the intermediate nodes on the current synchronization path are inconsistent.

If the intermediate node information only carries the accuracy class indication or the node hop information of the different synchronization accuracy information, the modification of the synchronization information may be reduced, and the compatibility with the related art may be better; and the information to be modified for each intermediate node is little, such that the time error introduced for the intermediate node to modify the synchronization information may further be reduced, and the synchronization effect may further be improved.

Accordingly, in the embodiment, the intermediate node for forwarding the synchronization information updates the node hop information of the intermediate node information according to the own synchronization accuracy information, thereby providing more bases for the subsequent node to be synchronized to select the synchronization information for synchronization; and thus, the convenience is provided for the node to be synchronized to select the optimal synchronization information in combination with the information of the synchronization source and the like, and the synchronization signal in the selected synchronization information is utilized for the synchronization. The operation that the node hop information of the intermediate node information is updated may include that: the node hop information is modified according to the synchronization accuracy information of the current node. When the node hop information is not written into the intermediate node information, the node hop information may be added into the intermediate node information according to the own synchronization accuracy information.

The synchronization signal may be a frequency signal or phase signal for clock synchronous, and may also be a time signal for time synchronous, etc.

In conclusion, in a first aspect of the embodiment of the disclosure, Step S120 may include the following operation.

Accuracy class indication for indicating the synchronization accuracy information of the current node is added to the synchronization information; or if the synchronization accuracy information corresponding to the accuracy class indication in the intermediate node information is different from that of the current node, the accuracy class indication is modified.

In a second aspect of the embodiment of the disclosure, Step S120 may further include that: when the received synchronization information indicates that the synchronization accuracy information of the passing intermediate node of the synchronization information is inconsistent with the synchronization accuracy information of the current node, the synchronization accuracy uniformity indication in the synchronization information is modified.

In a third aspect of the embodiment of the disclosure, Step S120 may further include that: the node hop indication of the corresponding synchronization accuracy information is modified according to the synchronization accuracy information of the current node; or the node hop indication corresponding to the synchronization accuracy information is increased.

Figure 3:
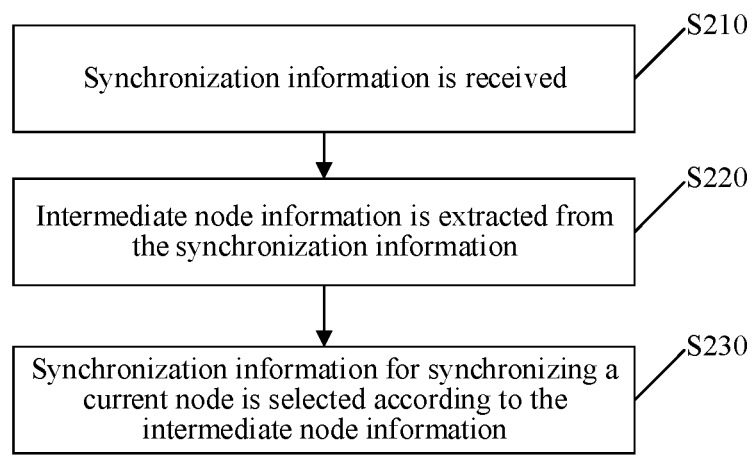
FIG. 3 illustrates a schematic flowchart diagram of a synchronization method according to an embodiment of the disclosure.

As illustrated in FIG. 3, an embodiment provides a synchronization method, which includes the following operations.

At S210: synchronization information is received.

At S220: intermediate node information is extracted from the synchronization information, the intermediate node information being indication information corresponding to synchronization accuracy information of an intermediate node for transmitting the synchronization information.

At S230: synchronization information for synchronizing a current node is selected according to the intermediate node information.

The synchronization method provided by the embodiment may be a method applied to a node to be synchronized. The synchronization information includes a synchronization signal provided by a synchronization source. If the node to be synchronized directly establishes connection with the synchronization source, the received synchronization information may be directly sent by the synchronization source. If the node to be synchronized does not establish direct connection with the synchronization source, the synchronization information is sent by the synchronization source and transmitted to the current node through one or more intermediate nodes on a synchronization path.

In the embodiment, the intermediate node information is extracted from the synchronization information, and the intermediate node information corresponds to synchronization accuracy information of the intermediate node. Therefore, in the embodiment, the node to be synchronized may be referred to as a synchronization node. The synchronization node may select the synchronization information according to the intermediate node information so as to select optimal synchronization information, thereby implementing high-accuracy clock synchronization or time synchronization.

In some embodiments, the synchronization information may further include: synchronization source information. The synchronization source information is used for indicating information of the synchronization source, such as synchronization accuracy information, time accuracy and an accuracy class, thereby directly or indirectly characterizing the accuracy of the synchronization signal carried in the synchronization information.

In the embodiment, the optimal synchronization information may be selected jointly in combination with the synchronization source information and the intermediate node information in Step S230, thus implementing the high-accuracy clock and/or time synchronization.

The synchronization source information may include one or more parameters. The intermediate node information may also include one or more parameters, for example, the accuracy class of each intermediate node, numbers of passing nodes of the different synchronization accuracy information, whether the accuracy classes of the intermediate nodes on the synchronous path are consistent, etc.

In the embodiment, parameter values of one or more parameters in at least one of the synchronization source information or the intermediate node information may be quantized according to a preset conversion policy, accuracy values of synchronization signals in different synchronization information are calculated, and synchronization information having a high accuracy value is selected as final reference information for clock or time synchronization.

For example, the accuracy value is relevant to the synchronization accuracy information of the synchronization source, the total number of node hops, the accuracy class of the intermediate node, and numbers of node hops at different accuracies. For example, such correlation may include at least one of the following.

The accuracy value is positively correlated with the synchronization accuracy information of the synchronization source.

The accuracy value is inversely correlated with the total number of passing hops.

The accuracy value is inversely correlated with the total number of passing intermediate nodes.

The accuracy value is positively correlated with the accuracy class of the passing intermediate node, etc.

In some embodiments, a preset conversion function may be pre-defined; then, the synchronization node calculates a functional value according to the synchronization source information and/or the intermediate node information, the functional value being the accuracy value; and thereafter, a synchronization signal is selected according to the calculated accuracy value for synchronization.

In some embodiments, Step S230 may include that: the synchronization information is selected according to at least one of an accuracy class indication, a synchronization accuracy uniformity indication, or a node hop indication in the intermediate node information.

For example, Step S230 may include at least one of the following.

When multiple pieces of synchronization information from a synchronization source at a same accuracy class are received, synchronization information in which an accuracy class of an intermediate node is higher is preferentially selected according to the accuracy class indications.

When multiple pieces of synchronization information from the synchronization source at the same accuracy class are received, synchronization information in which accuracy classes of intermediate nodes is higher and accuracy classes of the intermediate nodes are consistent is preferentially selected according to accuracy class indications and synchronization accuracy uniformity indications.

When multiple pieces of synchronization information from the synchronization source at the same accuracy class are received and when the intermediate nodes have the same accuracy class, synchronization information in which accuracy classes of intermediate nodes are consistent is preferentially selected according to accuracy class indications and synchronization accuracy uniformity indications.

When multiple pieces of synchronization information from the synchronization source at the same accuracy class are received, synchronization information in which a total number of hops is fewer and a number of intermediate nodes at a higher accuracy class is larger is preferentially selected according to node hop indications.

When multiple pieces of synchronization information from the synchronization source at the same accuracy class are received, equivalent conversion for numbers of passing node hops at different accuracy classes is performed according to node hop indications, and the synchronization information is selected according to conversion results.

The multiple pieces of synchronization information from the synchronization source at the same accuracy class includes at least one of the following:

synchronization information that is from the same synchronization source and is transmitted on different synchronization paths; apparently, the synchronization node receives multiple pieces of synchronization information from the same synchronization source, and the accuracy class of the synchronization source is obviously consistent; and synchronization information from different synchronization sources and multiple devices having the same accuracy class. Although the multiple pieces of synchronization information come from different synchronization sources, the different synchronization sources are at the same accuracy class. For the synchronization source, the provided synchronization signal has the same accuracy class, so the consideration is mainly given to the intermediate node information.

The time errors introduced by different accuracy classes have a conversion relationship, and may be as follows:

$$T = \theta_x + \sum_{i=1}^{I} X_i * t_i$$

Where, the T is a total time error of the synchronization signal transmitted from the synchronization source to the synchronization node, the $\theta_x$ is a time error caused by the synchronization source at the accuracy class x, the I is the total number of accuracy classes, the $X_i$ is the number of intermediate nodes having the accuracy class i, and $t_i$ is a time error introduced by the accuracy class i. Based on the above functional relationship, the T may be obtained, and the synchronization signal in the synchronization information with a smaller T is selected. Herein, the T is inversely correlated with the above accuracy value. The above is merely an example. During specific implementation, the above functional relationship is not limited.

The conversion relationship for different accuracy classes may be as follows:

$$Y = y + \sum_{i=1}^{I} X_i * i$$

Where, the Y is a general synchronization accuracy information class of the synchronization signal transmitted from the synchronization source to the synchronization node, the y is an accuracy class of the synchronization source, the I is a highest accuracy class, and the $X_i$ is the number of intermediate nodes having the accuracy class i. Based on the above functional relationship, Y may be obtained. The above is merely an example. During specific implementation, the above functional relationship is not limited. The higher accuracy class indicates that the synchronization accuracy information is lower, so synchronization information has a small value may be preferentially selected according to Y for clock synchronization or time synchronization.

Figure 4:
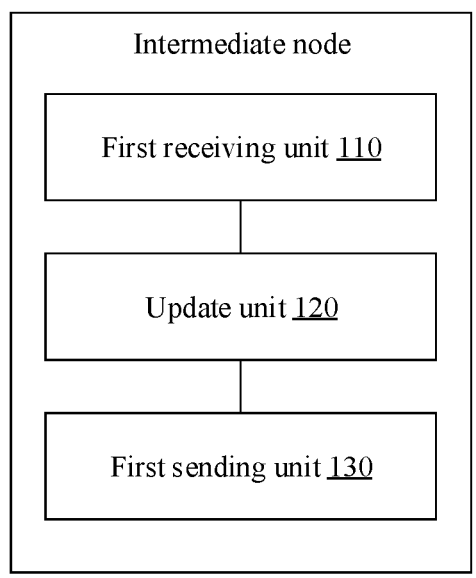
FIG. 4 illustrates a schematic structural diagram of an intermediate node according to an embodiment of the disclosure.

As illustrated in FIG. 4, an embodiment provides a network node. The network node may be the above intermediate node for forwarding the synchronization information. The network node includes a first receiving unit 110, an update unit 120, and a first sending unit 130.

The first receiving unit 110 is configured to receive synchronization information from a previous node.

The update unit is 120 configured to update intermediate node information in the synchronization information according to synchronization accuracy information of a current node.

The first sending unit 130 is configured to send the updated synchronization information to a next node.

The first receiving unit 110 and the first sending unit 130 may correspond to a network interface of the intermediate node. The network interface may be an optical cable interface or a cable interface, and may be configured to receive and send information.

The update unit 120 may correspond to a processor of the intermediate node. The processor may include: a central processor, a microprocessor, a digital signal processor, an application processor, a programmable array, or an application-specific integrated circuit, etc., and may be configured to process the information, such as writing new information into the synchronization information, and changing a part of the synchronization information.

In the embodiment of the disclosure, the synchronization information is carried by a synchronization message. A text portion of the synchronization message includes a synchronization signal for clock synchronization and/or time synchronization. A header of the message may carry the synchronization source information and/or the intermediate node information. As a result, when updating the synchronization information, the intermediate node does not need to read a text of the synchronization message, but only needs to process the header of the synchronization message.

Optionally, the update unit 120 may be specifically configured to: add an accuracy class indication for indicating the synchronization accuracy information of the current node into the synchronization information; or, modify, when synchronization accuracy information corresponding to the accuracy class indication in the intermediate node information is different from that of the current node, the accuracy class indication.

Optionally, the update unit 120 may be configured to modify, when synchronization accuracy information, in the synchronization information, of an intermediate node through which the synchronization information has passed is inconsistent with the synchronization accuracy information of the current node, a synchronization accuracy uniformity indication in the synchronization information. The synchronization accuracy uniformity indication indicates whether synchronization accuracies of the intermediate nodes for transmitting the synchronization information are consistent.

Further optionally, the update unit 120 may be configured to modify, a node hop indication corresponding to the synchronization accuracy information according to the synchronization accuracy information of the current node; or, add a node hop indication corresponding to the synchronization accuracy information of the current node into the intermediate node information.

Figure 5:
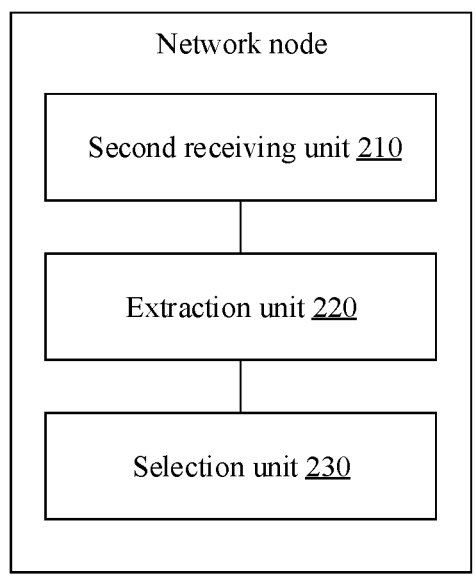
FIG. 5 illustrates a schematic structural diagram of a network node according to an embodiment of the disclosure.

As illustrated in FIG. 5, an embodiment provides a network node, which includes: a second receiving unit 210, an extraction unit 220 and a selection unit 230.

The second receiving unit 210 is configured to receive synchronization information.

The extraction unit 220 is configured to extract intermediate node information from the synchronization information, the intermediate node information being indication information corresponding to synchronization accuracy information of an intermediate node for transmitting the synchronization information.

The selection unit 230 is configured to determine, based on the intermediate node information, synchronization information for synchronizing a current node.

The second receiving unit 210 may correspond to a communication interface. The communication interface may be configured to receive the synchronization information.

Both the extraction unit 220 and the selection unit 230 may correspond to a processor, and may be configured to extract the intermediate node information from the synchronization information, and select synchronization information having a minimum introduced time error from multiple pieces of received synchronization information for synchronization.

Optionally, the selection unit 230 may be configured to select the synchronization information according to at least one of an accuracy class indication, a synchronization accuracy uniformity indication, or a node hop indication in the intermediate node information.

Optionally, the selection unit 230 may be specifically configured to: when multiple pieces of synchronization information from the same synchronization source are received, preferentially select, according to accuracy class indications, synchronization information in which accuracy classes of intermediate nodes are higher; when multiple pieces of synchronization information from the same synchronization source are received, preferentially select, according to the accuracy class indications and synchronization accuracy uniformity indications, synchronization information in which accuracy classes of the intermediate nodes are higher and the accuracy classes of the intermediate nodes are consistent; when multiple pieces of synchronization information from the same synchronization source are received and when the intermediate classes have the same accuracy class, preferentially select, according to the accuracy class indications and the synchronization accuracy uniformity indications, synchronization information in which accuracy classes of the intermediate nodes are consistent; when multiple pieces of synchronization information from the same synchronization source are received, preferentially select, according to node hop indications, synchronization information in which a total number of hops is fewer and a number of intermediate nodes with higher accuracy classes is larger; and when multiple pieces of synchronization information from the same synchronization source are received, perform equivalent conversion for numbers of passing node hops at different accuracy classes according to the node hop indications, and select the synchronization information according to conversion results.

Figure 6:
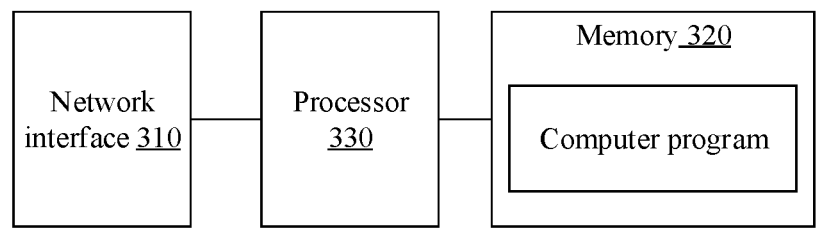
FIG. 6 illustrates a schematic structural diagram of another network node according to an embodiment of the disclosure.

In some embodiments, as illustrated in FIG. 6, the embodiment provides a network node, which includes: a network interface 310, a memory 320, a processor 330, and a computer program stored on the memory 320 and executed by the processor.

The processor 330 is connected to the network interface 310 and the memory 320, and configured to perform, by executing the computer program, the synchronization information transmission method provided by the above one or more technical solutions, or perform the synchronization method provided by the above one or more technical solutions.

In the embodiment, the network interface 310 may correspond to various types of interfaces, such as a network interface or a transceiving antenna.

The memory 320 may include a device storing various types of information.

The processor 330 may include: a central processor, a microprocessor, a digital signal processor, an application processor, a programmable array or an application-specific integrated circuit, etc., and may be configured to perform, by executing computer executable instructions such as a computer program, a beam power control method applied to a first communication device.

The processor 330 may be connected to a network interface (i.e., transceiver) 310 and the memory through a communication bus (such as an integrated circuit bus).

The network node provided by the embodiment of the disclosure may be the above intermediate node. If the network node is the intermediate node, the intermediate node may be configured to execute the synchronization information transmission method provided by the above one or more technical solutions, such as the method illustrated in FIG. 2. If the network node is a synchronization node, the network node may be configured to implement the synchronization method provided by the above one or more technical solutions, such as the method illustrated in FIG. 3.

An embodiment provides a computer storage medium, which stores a computer program; and the computer program implements, after being executed, the synchronization information transmission method provided by the above one or more technical solutions, or implements the synchronization method provided by the above one or more technical solutions.

The computer storage medium may be: various media capable of storing a program code such as a mobile storage device, a Read-Only Memory (ROM), a Random Access Memory (RAM), a magnetic disk or an optical disc, optionally a non-transient storage medium or a non-volatile storage medium.

Several specific examples are provided below in combination with the above embodiments.

First Example

In the example, the intermediate node carries an identifier in the sending synchronization information, and the identifier is used for indicating the accuracy class of the node in the synchronization network.

For example, two types of time nodes are provided in the synchronization network, i.e., time nodes of the common accuracy, and time nodes of the ultra-high accuracy. As a result, the nodes having different accuracies use different identifier information. Herein, the common accuracy is lower than the ultra-high accuracy, i.e., the common accuracy and the ultra-high accuracy belong to two different accuracy classes.

The identifier information may be different types of codes. For example, the bit value "0" indicates the common accuracy, and the bit value "1" indicates the ultra-high accuracy. The identifier information may be different version numbers. The low version number indicates the common accuracy, and the high version number indicates the ultra-high accuracy. The identifier information may further be based on different accuracy index identifiers, for example, the value corresponding to the accuracy of 30 ns denotes the common accuracy, and the value corresponding to the accuracy of 5 ns denotes the ultra-high accuracy.

The identifier information may be carried in a reserved byte of the synchronization information, or identified by an extended byte of a field or an extended field of the synchronization information, or transmitted in an extended field of a synchronization information message, or transmitted by a new synchronization information message. The synchronization information in the example may be frequency synchronization information or time synchronization information.

Second Example

In the example, when the intermediate node indicated by the synchronization message received by one node is a node at a lower class and the current node is a node at a higher class, the synchronization message sent by the current node carries identifier information corresponding to the higher class. The identifier information may be one of the above accuracy class uniformity indications.

For example, the bit value "0" indicates the common accuracy node, and the bit value "1" indicates the ultra-high accuracy node. When the identifier in the message received by the node indicates that the bit value is "0", it is indicated that the previous node is the common accuracy node; and when the current node is the ultra-high accuracy node, the bit value "0" is changed into the bit value "1" for sending in the synchronization message sent by the current node.

Figure 7A:
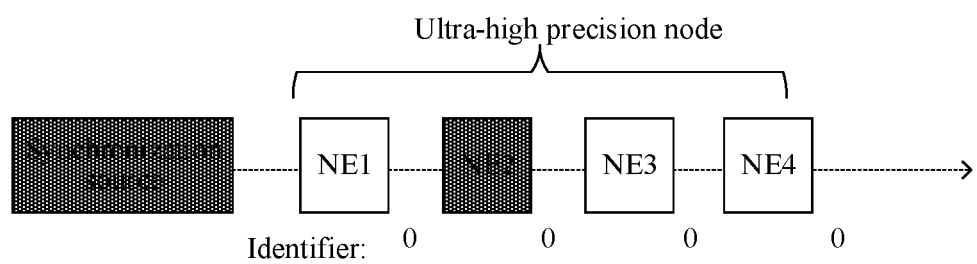
FIG. 7A illustrates a first schematic diagram of a change of an accuracy class uniformity indication according to an embodiment of the disclosure.
Figure 7B:
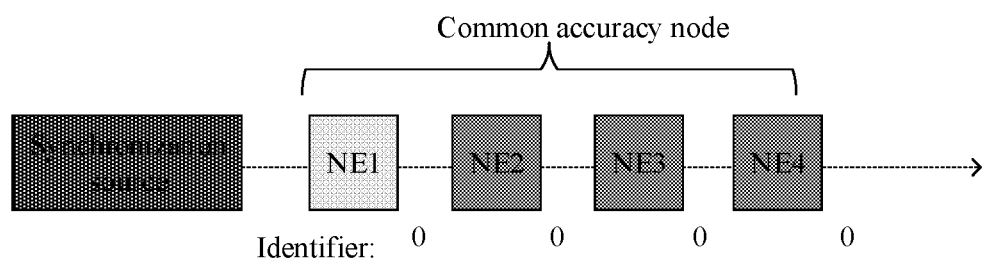
FIG. 7B illustrates a second schematic diagram of a change of an accuracy class uniformity indication according to an embodiment of the disclosure.

As illustrated in FIG. 7A and FIG. 7B, the value of the accuracy class uniformity indication is always the default value "0," which indicates that all nodes on the synchronization path have the same accuracy class. The difference lies in that all intermediate nodes in FIG. 7A have the ultra-high accuracy, and all intermediate nodes in FIG. 7B have the common accuracy.

Figure 7C:
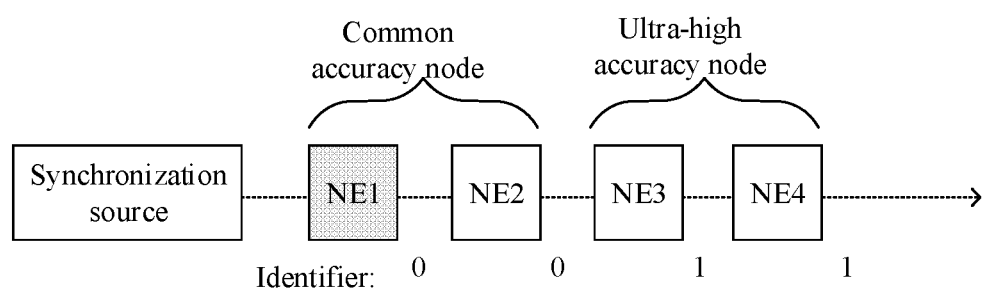
FIG. 7C illustrates a third schematic diagram of a change of an accuracy class uniformity indication according to an embodiment of the disclosure.

As illustrated in FIG. 7C, the value of the accuracy class uniformity indication is modified to "1" from the default value "0." Since both the NE3 and the NE4 are the ultra-high accuracy nodes, and both the NE1 and the NE2 are the common accuracy nodes, the value of the identifier is modified to the non-default value "1" in NE3. The value is not modified once being modified as the non-default value.

Further, besides the identifier for indicating the class of the node, the synchronization information sent by the node may also carry an identifier for indicating whether passing nodes on the synchronization path have the same class.

For example, if the passing nodes on the synchronization path are all the ultra-high accuracy nodes, one identifier is used and filled out as the bit value "0," it indicates that each hop of device is the ultra-high accuracy node. If the nodes through which the synchronization information have passed on the synchronization path are the common accuracy nodes, the identifier is always filled out as the bit value "0" to indicate that each previously passing hop of device has the same class. If one ultra-high accuracy node is passed on the synchronization path, the value of identifier is changed into the bit value "1" to indicate that the nodes on the synchronization path have non-uniform classes.

Besides synchronization hop information of the whole path, the node further carries hop information of the passing intermediate node at a class in the sending synchronization information.

Figure 8:
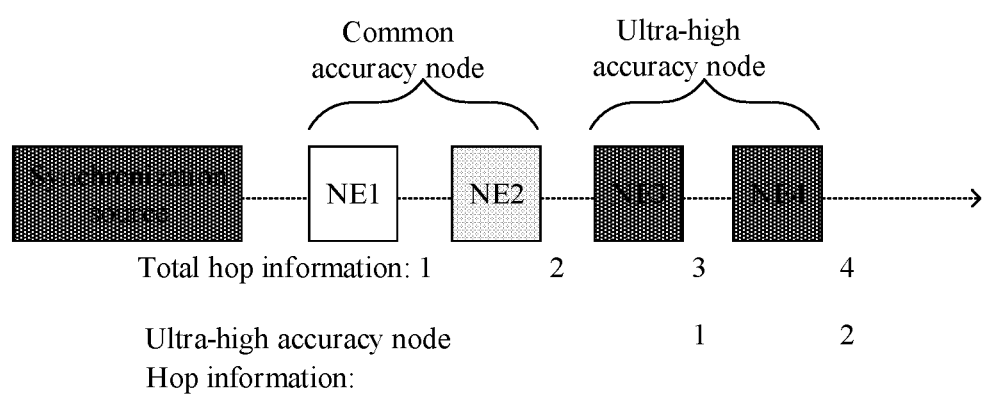
FIG. 8 illustrates a schematic diagram of a change of node hop information at different accuracy classes according to an embodiment of the disclosure.

For example, two types of nodes are included in the synchronization network: a common accuracy node and an ultra-high accuracy node. The node carries the synchronization hop information of the whole path and carries hop information of the passing ultra-high accuracy node in the sending synchronization information. As illustrated in FIG. 8, whenever one node is passed, the total hop information is increased by 1; and whenever one ultra-high accuracy node is passed, the hop information of the ultra-high accuracy node is increased by 1.

The number of nodes with ultra-high accuracy and the hop information are recorded in FIG. 8. The hop information indicates the total node hop information.

When the node receives multiple synchronization signals for source selection, if the synchronization signals are from the same synchronization source, the identifier carried in the synchronization information for indicating the class of the node in the synchronization network is used for the source selection.

If the class of the node in the synchronization network is higher, the node selects the synchronization signal on this path.

Further, if the node receives multiple synchronization signals from the same synchronization source, besides an identifier for indicating the class of the node, the node further carries, in the synchronization information, an identifier for indicating whether passing nodes on the synchronization path have the same class. The node selects, according to the identifiers, a path signal in which the node in the synchronization network has the high class and the node on the synchronization path is the node at the high class.

For example, two types of nodes are included in the synchronization network: a common accuracy node and an ultra-high accuracy node. In the synchronization information, a previous bit is used for identifying the class of the node, the bit value "0" indicates the common accuracy node and the bit value "1" indicates the ultra-high accuracy node; and meanwhile, a next bit is used for identifying whether the passing nodes on the synchronization path have the same class, and the bit value "0" indicates that all previous passing hop of devices have the same class. The bit value "1" indicates that the passing nodes on the synchronization path have non-uniform classes.

It is assumed that the node receives three synchronization signals from the same synchronization source. If the first synchronization signal carries the identifier "00," it is indicated that the nodes on the path are the common accuracy nodes; if the second synchronization signal carries the identifier "10," it is indicated that the nodes on the path are the ultra-high accuracy nodes. If the third synchronization signal carries the identifier "11," it is indicated that the path not only has the ultra-high accuracy node but also has the common accuracy node. According to the identifier information, the node may select the second path.

When the node receives multiple synchronization signals for source selection, if the synchronization signals are from the same synchronization source, the synchronization hop information of the whole path and the hop information of the intermediate node at a class that are carried in the synchronization information are used for the source selection.

In an implementation, the synchronization hop information of the whole path and the hop information of the intermediate node at a class are processed uniformly to obtain comparable hop information for the source selection. For example, two types of nodes are included in the synchronization network: a common accuracy node and an ultra-high accuracy node. During source selection, one common accuracy node is equivalent to two ultra-high accuracy nodes. According to the synchronization hop information of the whole path and the hop information of the intermediate nodes at a class, the number of all ultra-high accuracy nodes equal to the whole path may be converted, and the hop information after the conversion is used for the source selection; and the smaller the number of hops after the conversion, the better the path.

The node carries an identifier in the sending synchronization information, and the identifier is used for indicating the accuracy class of the node in the synchronization network.

When the identifier in the synchronization message received by the node indicates that the intermediate node through which the synchronization message has passed is at a lower class and when the current node is a node at a high class, the synchronization message sent by the current node carries identifier information corresponding to the higher class.

Besides the identifier for indicating the class of the node, the node may further carry, in the synchronization information, an identifier for indicating whether passing nodes on the synchronization path have the same class.

Besides the synchronization hop information of the whole path, the node further carries hop information of the passing intermediate node at a certain class in the sending synchronization information.

When the node receives multiple synchronization signals for source selection, if the synchronization signals are from the same synchronization source, the identifier carried in the synchronization information for indicating the class of the node in the synchronization network is used for the source selection.

Further, if the node receives multiple synchronization signals from the same synchronization source, besides the identifier for indicating the class of the node, an identifier for indicating whether passing nodes on the synchronization path have the same class is also included in the synchronization information. The node selects, according to the identifiers, a path signal in which the node in the synchronization network has the high class and the node on the synchronization path is the node at the high class.

When the node receives multiple synchronization signals for source selection, if the synchronization signals are from the same synchronization source, the synchronization hop information of the whole path and the hop information of the intermediate node at a certain class that are carried in the synchronization information are used for the source selection.

By means of the method for carrying the identifier (including the node class, whether the nodes have the same class, and hop information at a certain class) in the synchronization information, the disclosure may carry the information of the intermediate node in the network, and thus the downstream node may obtain accurate network information and perform the source selection.

In the several embodiments provided in the disclosure, it should be understood that the disclosed device and method may be implemented in other manners. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each function unit in each embodiment of the disclosure may be integrated into a processing module, each unit may also exist independently, and two or more than two units may also be integrated into one unit. The integrated unit may be implemented in a hardware form, and may also be implemented in form of hardware and software function unit.

Those of ordinary skill in the art should know that: all or part of the steps of the abovementioned method embodiment may be implemented by instructing related hardware through a program, the abovementioned program may be stored in a computer-readable storage medium, and the program is executed to execute the steps of the abovementioned method embodiment; and the storage medium includes: various media capable of storing program codes such as mobile storage equipment, a Read-Only Memory (ROM), a Random Access Memory (RAM), a magnetic disk or an optical disc.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subjected to the scope of protection of the claims.

The invention claimed is:

1. A method for synchronization information transmission, comprising:
    receiving synchronization information from a previous node;
    updating intermediate node information in the synchronization information based on synchronization accuracy information of a current node, wherein the intermediate node information comprises at least one of an accuracy class indication, a synchronization accuracy uniformity indication, or node hop indication of different pieces of synchronization accuracy information, the synchronization accuracy uniformity indication indicating whether synchronization accuracies of intermediate nodes for transmitting the synchronization information are consistent; and
    sending the updated synchronization information to a next node.

2. The method of claim 1, wherein updating the intermediate node information in the synchronization information based on the synchronization accuracy information of the current node comprises:
    adding the accuracy class indication for indicating the synchronization accuracy information of the current node into the synchronization information.

3. The method of claim 1, wherein updating the intermediate node information in the synchronization information based on the synchronization accuracy information of the current node comprises:
    when synchronization accuracy information corresponding to the accuracy class indication in the intermediate node information is different from the synchronization accuracy information of the current node, modifying the accuracy class indication.

4. The method of claim 1, wherein updating the intermediate node information in the synchronization information based on the synchronization accuracy information of the current node comprises:
    when synchronization accuracy information, in the synchronization information, of an intermediate node through which the synchronization information has passed is inconsistent with the synchronization accuracy information of the current node, modifying the synchronization accuracy uniformity indication in the synchronization information.

5. The method of claim 1, wherein updating the intermediate node information in the synchronization information based on the synchronization accuracy information of the current node comprises:
    modifying the node hop indication corresponding to the synchronization accuracy information of the current node.

6. The method of claim 1, wherein updating the intermediate node information in the synchronization information based on the synchronization accuracy information of the current node comprises:
    adding the node hop indication corresponding to the synchronization accuracy information of the current node into the intermediate node information.

7. A non-transitory computer storage medium having stored therein a computer program that, when executed by a processor, causes the processor to perform the method of claim 1.

8. A synchronization method, comprising:
    receiving synchronization information;
    extracting intermediate node information from the synchronization information, wherein the intermediate node information is indication information corresponding to synchronization accuracy information of an intermediate node for transmitting the synchronization information, wherein the intermediate node information comprises at least one of an accuracy class indication, a synchronization accuracy uniformity indication, or node hop indication of different pieces of synchronization accuracy information, the synchronization accuracy uniformity indication indicating whether synchronization accuracies of intermediate nodes for transmitting the synchronization information are consistent; and
    determining, based on the intermediate node information, synchronization information for synchronizing a current node.

9. The method of claim 8, wherein determining, based on the intermediate node information, the synchronization information for synchronizing the current node comprises:
    determining the synchronization information for synchronizing the current node according to at least one of the accuracy class indication, the synchronization accuracy uniformity indication, or the node hop indication in the intermediate node information.

10. The method of claim 8, wherein determining the synchronization information according to at least one of the accuracy class indication, the synchronization accuracy uniformity indication, or the node hop indication in the intermediate node information comprises at least one of the followings:
    when a plurality of pieces of synchronization information from a same synchronization source are received, selecting, according to accuracy class indications, synchronization information in which accuracy classes of intermediate nodes are higher;
    when the plurality of pieces of synchronization information from the same synchronization source are received, selecting, according to the accuracy class indications and synchronization accuracy uniformity indications, synchronization information in which accuracy classes of intermediate nodes are higher and the accuracy classes of the intermediate nodes are the same;
    when the plurality of pieces of synchronization information from the same synchronization source are received and when intermediate nodes have the same accuracy class, selecting, according to the accuracy class indications and the synchronization accuracy uniformity indications, synchronization information in which the accuracy classes of the intermediate nodes are the same;
    when the plurality of pieces of synchronization information from the same synchronization source are received, selecting, according to node hop indications, synchronization information in which a total number of hops is fewer and a number of intermediate nodes with higher accuracy classes is larger; or,
    when the plurality of pieces of synchronization information from the same synchronization source are received, performing equivalent conversion for numbers of passing node hops at different accuracy classes according to node hop indications, and selecting the synchronization information according to conversion results.

11. A non-transitory computer storage medium having stored therein a computer program that, when executed a processor, causes the processor to perform the method of claim 8.

12. A network node, comprising:
a network interface;
a processor; and
a memory storing a computer program executable by the processor;
wherein the processor is connected to the network interface and the memory, and configured to perform, by executing the computer program, operations comprising:
receiving synchronization information from a previous node;
updating intermediate node information in the synchronization information based on synchronization accuracy information of a current node, wherein the intermediate node information comprises at least one of an accuracy class indication, a synchronization accuracy uniformity indication, or node hop indication of different pieces of synchronization accuracy information, the synchronization accuracy uniformity indication indicating whether synchronization accuracies of intermediate nodes for transmitting the synchronization information are consistent; and
sending the updated synchronization information to a next node.

13. The network node of claim 12, wherein updating the intermediate node information in the synchronization information based on the synchronization accuracy information of the current node comprises:
adding the accuracy class indication for indicating the synchronization accuracy information of the current node into the synchronization information.

14. The network node of claim 12, wherein updating the intermediate node information in the synchronization information based on the synchronization accuracy information of the current node comprises:
when synchronization accuracy information corresponding to the accuracy class indication in the intermediate node information is different from the synchronization accuracy information of the current node, modifying the accuracy class indication.

15. The network node of claim 12, wherein updating the intermediate node information in the synchronization information based on the synchronization accuracy information of the current node comprises:
when synchronization accuracy information, in the synchronization information, of an intermediate node through which the synchronization information has passed is inconsistent with the synchronization accuracy information of the current node, modifying the synchronization accuracy uniformity indication in the synchronization information.

16. The network node of claim 12, wherein updating the intermediate node information in the synchronization information based on the synchronization accuracy information of the current node comprises:
modifying the node hop indication corresponding to the synchronization accuracy information of the current node.

17. The network node of claim 12, wherein updating the intermediate node information in the synchronization information based on the synchronization accuracy information of the current node comprises:
adding the node hop indication corresponding to the synchronization accuracy information of the current node into the intermediate node information.

18. A network node, comprising:
a network interface;
a processor; and
a memory storing a computer program executable by the processor;
wherein the processor is connected to the network interface and the memory, and configured to perform, by executing the computer program, a synchronization method, and the method comprises:
receiving synchronization information;
extracting intermediate node information from the synchronization information, wherein the intermediate node information is indication information corresponding to synchronization accuracy information of an intermediate node for transmitting the synchronization information, wherein the intermediate node information comprises at least one of an accuracy class indication, a synchronization accuracy uniformity indication, or node hop indication of different pieces of synchronization accuracy information, the synchronization accuracy uniformity indication indicating whether synchronization accuracies of intermediate nodes for transmitting the synchronization information are consistent; and
determining, based on the intermediate node information, synchronization information for synchronizing a current node.

19. The network node of claim 18, wherein determining, based on the intermediate node information, the synchronization information for synchronizing the current node comprises:
determining the synchronization information for synchronizing the current node according to at least one of the accuracy class indication, the synchronization accuracy uniformity indication, or the node hop indication in the intermediate node information.

20. The network node of claim 18, wherein determining the synchronization information according to at least one of the accuracy class indication, the synchronization accuracy uniformity indication, or the node hop indication in the intermediate node information comprises at least one of the followings:
when a plurality of pieces of synchronization information from a same synchronization source are received, selecting, according to accuracy class indications, synchronization information in which accuracy classes of intermediate nodes are higher;
when the plurality of pieces of synchronization information from the same synchronization source are received, selecting, according to the accuracy class indications and synchronization accuracy uniformity indications, synchronization information in which accuracy classes of intermediate nodes are higher and the accuracy classes of the intermediate nodes are the same;
when the plurality of pieces of synchronization information from the same synchronization source are received and when intermediate nodes have the same accuracy class, selecting, according to the accuracy class indications and the synchronization accuracy uniformity indications, synchronization information in which the accuracy classes of the intermediate nodes are the same;

when the plurality of pieces of synchronization information from the same synchronization source are received, selecting, according to node hop indications, synchronization information in which a total number of hops is fewer and a number of intermediate nodes with higher accuracy classes is larger; or, when the plurality of pieces of synchronization information from the same synchronization source are received, performing equivalent conversion for numbers of passing node hops at different accuracy classes according to node hop indications, and selecting the synchronization information according to conversion results.

* * * * *